F. STREICH.
BUN AND BREAD MOLDER AND ROUNDER.
APPLICATION FILED SEPT. 19, 1914.
1,152,348.
Patented Aug. 31, 1915.
3 SHEETS—SHEET 1.
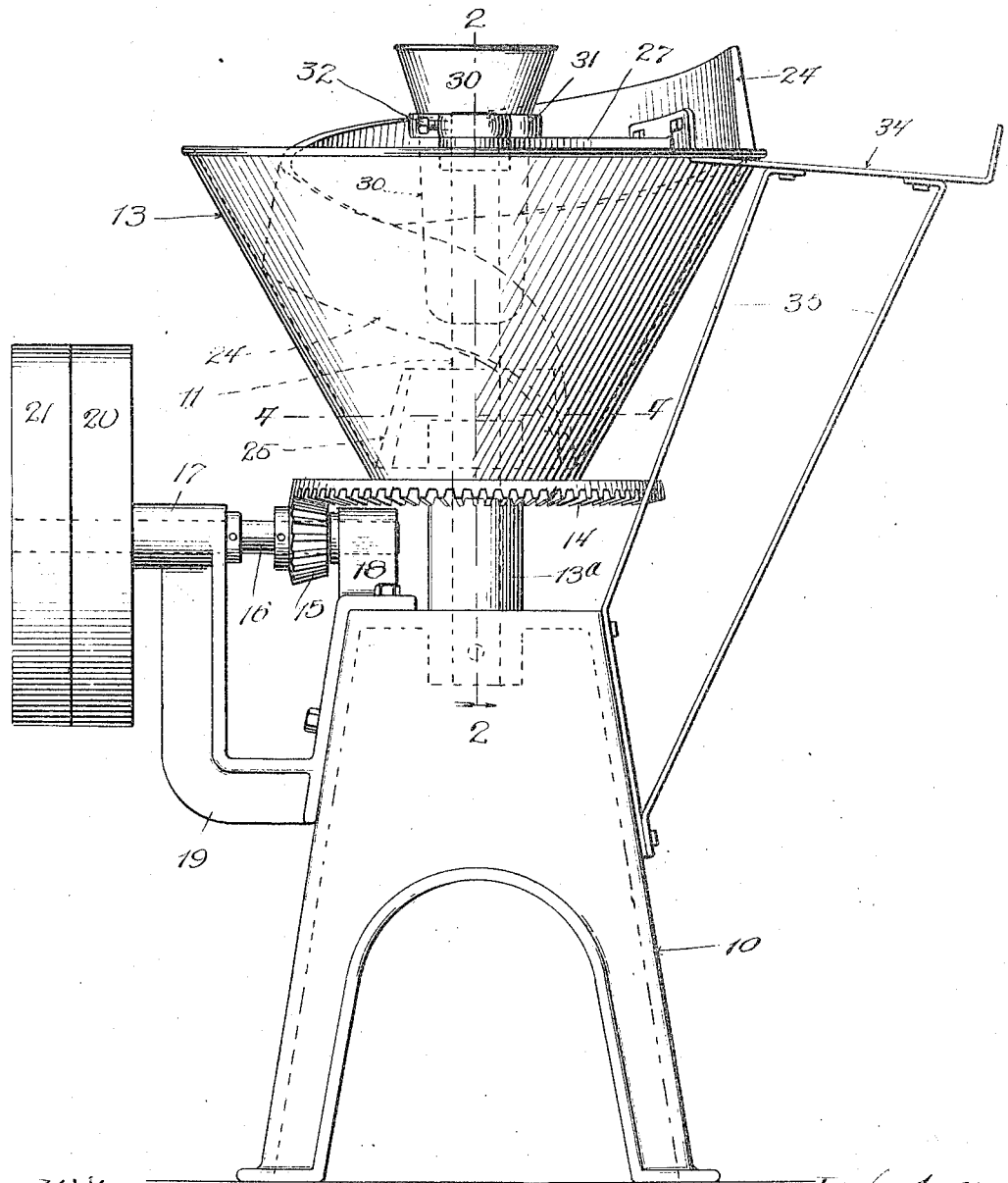

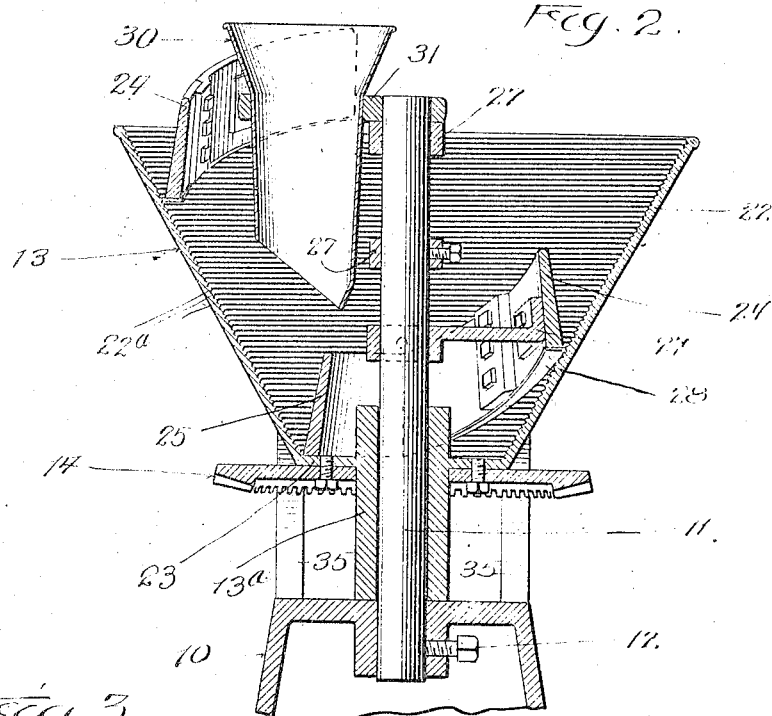
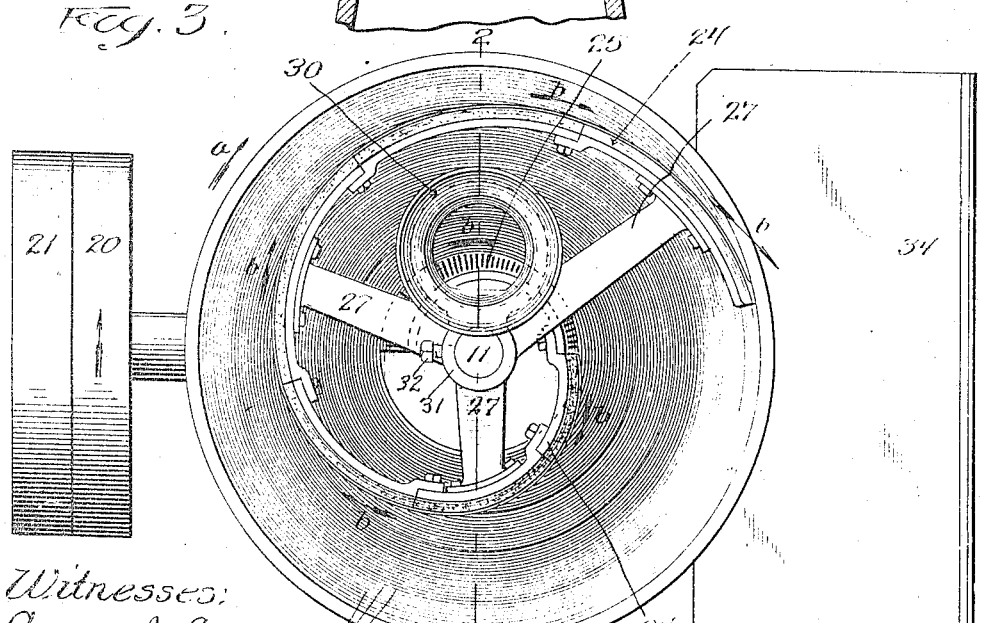

F. STREICH.
BUN AND BREAD MOLDER AND ROUNDER.
APPLICATION FILED SEPT. 19, 1914.
1,152,348.
Patented Aug. 31, 1915.
3 SHEETS—SHEET 3.
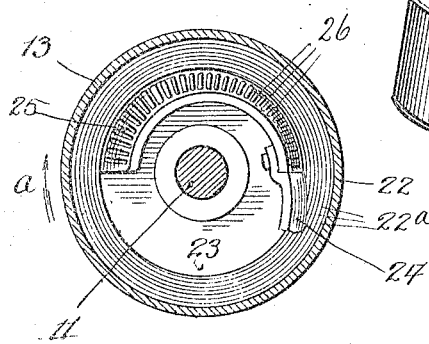
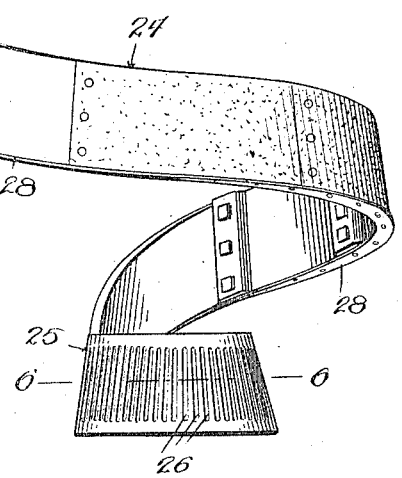
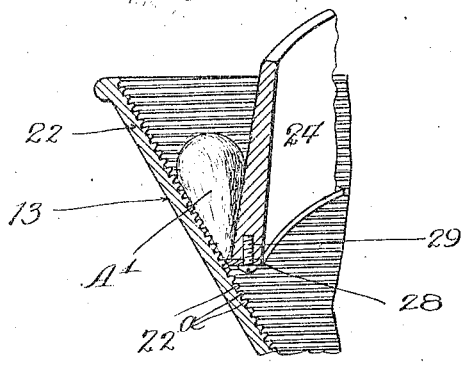
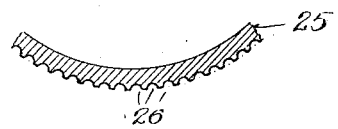
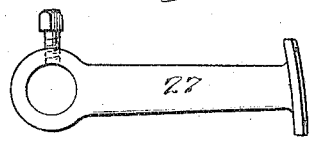
Witnesses:
Anna J. Cohon
Gertrude E. Dowle
Inventor:
Frank Streich,
by Charles O. Shervey
his Atty.

UNITED STATES PATENT OFFICE.

FRANK STREICH, OF JOLIET, ILLINOIS, ASSIGNOR TO THE UNION WRAPPING MACHINE COMPANY, OF JOLIET, ILLINOIS, A CORPORATION OF ILLINOIS.

BUN AND BREAD MOLDER AND ROUNDER.

1,152,348.

Specification of Letters Patent.

Patented Aug. 31, 1915.

Application filed September 19, 1914. Serial No. 862,461.

*To all whom it may concern:*

Be it known that I, FRANK STREICH, a citizen of the United States, and a resident of Joliet, county of Will, and State of Illinois, have invented certain new and useful Improvements in Bun and Bread Molders and Rounders, of which the following is declared to be a full, clear, and exact description.

This invention relates to bun and bread molding and rounding machines, and its principal object is to provide a machine of this class of simple, efficient, and improved construction.

Another object is to provide a bun and bread roller and rounder of large capacity for a given size.

Another object is to provide means for shaping up the rough dough and "turning in the skin" thereof so as to present a smooth, finished appearance similar to that presented when buns have been rolled by hand.

Other objects and advantages will be found in the following specification, and with all of said objects and advantages in view, this invention consists in the several novel features hereinafter fully described and claimed.

The invention is clearly illustrated in the accompanying drawings, in which:—

Figure 1 is a side elevation of a complete machine embodying a simple form of the present invention. Fig. 2 is a vertical, cross section taken on the line 2—2 of Figs. 1 and 3. Fig. 3 is a plan of the machine. Fig. 4 is a horizontal section taken on line 4—4 of Fig. 1. Fig. 5 is a side view of a spiral mold board forming part of the rounding or rolling mechanism. Fig. 6 is a detail, horizontal section taken on line 6—6 of Fig. 5. Fig. 7 is a detail, fragmental, sectional view of the rotary head and spiral mold board. Fig. 8 is a plan of a supporting arm for said mold board, and Fig. 9 is a view of a bun molded and rolled by the machine.

Referring to said drawings, 10, designates a base or pedestal, from the upper end of which projects an upright, stationary shaft, 11, that is secured in the top of the base by a set screw, 12, (see Fig. 2). Surrounding and turning upon said shaft, 11, is a head or drum, 13, which has a downwardly projecting hub, 13$^a$, that rests upon the top of the base or pedestal, 10. Means are provided for rotating said head or drum 13, and in the simple gearing, shown in the drawings, 14 designates a beveled gear wheel secured to the underside of the head, and meshing with a beveled pinion 15, fast on a horizontal shaft 16, journaled in bearing boxes 17, 18, formed on a bracket 19, secured to the base or pedestal. The shaft 16, has a tight pulley 20, and a loose pulley 21, thereon which may be belted to any suitable source of power. The mechanism just described forms a very simple one for rotating the head or drum, but many other simple forms of driving means may be substituted therefor which are within the knowledge and skill of persons familiar with this art.

The head 13 has an upwardly flaring, annular wall 22, conical in formation, and said head is open at the top, and closed at the bottom by a bottom piece 23. The inner face of the wall 22, constitutes the dough rolling surface and it has a spiral thread 22$^a$, running from the top to the bottom of the wall, which thread is a left-hand thread, assuming the head rotates in the direction of the arrow, $a$, in Fig. 3. Although the exact taper or incline of the wall 22, is immaterial, I have found by experimenting that a wall 60 degrees to the horizontal is very effective for the purpose intended. Coöperating with said rotating, conical wall 22, is a helical or spiral band or strip 24, which forms a mold board, the lower edge of which contacts with the inner conical face of the wall 22, and forms a helical, spiral groove, V shaped in cross section. Preferably the outer face of the helical or spiral band slopes inward toward the center of the head (see Fig. 7), although this peculiar arrangement is not absolutely necessary. The lowest turn 25, of the spiral mold board 24, is semicircular in extent (see Fig. 4) and rests upon the bottom piece 23, of the head 13, fitting against the inner face of the conical wall 22, at its juncture with the bottom piece. The outer face of said concentric part 25, of the mold board is roughened, as, for instance, by upright flutings 26 (see Figs. 4 to 6), to aid in starting the lump of dough through the molding and rolling devices. Preferably the remainder of the mold board is also made in sections for the sake of convenience in construction, said sections having overlapping end portions, bolted or otherwise secured to the adjacent end portions of the other sections. The outer face of the mold board is roughened from its lower end to a point near its upper end where the rough surface is omitted (see Figs. 3 and 5), said roughened portion aiding the head to roll and move the dough up the inclined mold board. The mold board 24, is stationarily mounted in the head 13, and as shown is secured to the upright shaft 11, by a plurality of arms 27, of successively increasing length, from bottom to top, said arms being bolted at one end to the inner faces of certain of the mold board sections, and having hubs at their other ends bolted to the upright shaft 11. The lower edge of the spiral mold board extends from the bottom of the head to its upper edge and along its lower edge is a helical scraper or knife 28, secured thereto as by screws 29 (see Fig. 7), said scraper or knife contacting with the inner threaded face of the wall 22, to cut away any dough that may adhere to said wall.

Above the V shaped trough or groove, between the first turn 25, of the mold board and wall 22, of the head, is a feed chute 30, which extends from a point near the top of the head to a point near said groove (see Fig. 2), and said feed chute is secured in a bracket 31, rotatively mounted upon the upper end of the vertical shaft 11, and secured thereon by a set screw 32, threaded in the bracket and bearing against the said shaft. By shifting the bracket 31, around on the shaft the point of delivery of the raw dough into the trough or groove may be changed to give more or less action of the molding devices upon the dough.

Adjacent to the top of the head 13, and in front of the end of the mold board, is a table 34, which fits against the outer face of the head, and is supported by brackets 35, secured to, and extending upward from the base 10.

In the operation of the machine the head is rotated in the direction of the arrow $a$, (Fig. 3), at a fairly rapid rate and lumps of raw dough (which have been previously cut to size) are dropped into the chute in rapid succession; they may follow each other into the machine quite closely because in the operation of this machine they become separated farther apart from each other as they travel up in the spiral groove or trough.

The rough lumps of dough fall into the trough or groove between the concentric ring part 25, of the mold board and the conical wall 22, of the head, and the rotating, threaded, inner face of said wall moves them forward (in the direction of the arrows, $b$, in Fig. 3), at the same time turning them upon axes of their own. Although the lumps of dough may be roughly formed when they fall into the trough or groove, the co-acting faces of the inclined wall 22, and mold board 24, in their action on them, roll them into the form, graphically illustrated at $A^1$, in Fig. 7, after which the spiral thread $22^a$, folds or kneads in the surface portion of the lumps of dough, drawing it in a downward direction, while the dough is being turned around against the mold board, and moved upward along the spiral groove until it reaches the extreme top thereof and is discharged upon the table 34, at which time it has been given the usual round shape (see Fig. 9), of a bun or round bread. In the last stages of the rounding process the bun rises to the top of the internal wall 22, and at that place the skin has been drawn completely around the bun except at one spot at the bottom as is customary in hand rolling.

The machine may be made in various sizes, but with a machine of a given size, both small and large buns may be molded and rounded, and with a machine of a larger size, small and large loaves of bread may be perfectly molded.

More or less variations of the exact details of construction may be made without departing from the spirit of this invention, and I desire, therefore, not to limit my invention to the exact details shown and described, but intend in the following claims to point out all of the invention disclosed herein.

I claim as new and desire to secure by Letters Patent:

1. In a machine of the class described, the combination of a rotary head having an internal face of inverted, conical formation, formed with ridges and grooves therebetween extending around on said face in approximately horizontal planes, and a stationarily supported, spirally shaped, mold board in said head extending along its inner, conical face in a spiral direction, and having its receiving end at the bottom, said ridges crossing said mold board at an acute angle.

2. In a machine of the class described, the combination of a rotary head having an upwardly flaring, internal face for rolling dough, and a spirally shaped mold board in said head, extending from the bottom to the top thereof along its internal face, the face of said mold board opposing the internal face of the head being straight in cross section and inclined downward toward the internal face of the head, and forming with said wall of the head a spiral trough having two inclined sides.

3. In a machine of the class described, the combination of a rotary dough rolling head, having an upwardly flaring internal face formed with a spiral thread thereon, running around said face in approximately horizontal planes, of a spirally shaped mold board in said head extending along its internal face and forming therewith a V-shaped trough or groove of spiral formation having two inclined sides, said mold board having a roughened portion along its face which opposes the face of the head, and said mold board crossing the spiral thread on the head at an acute angle.

4. In a machine of the class described, the combination of a rotary head, having an upwardly flaring, internal dough rolling face formed with a spiral thread thereon, running around said face in approximately horizontal planes and a spirally formed mold board in said head having a concentric portion at the bottom formed with transverse flutings on its face adjacent the internal face of the head, and a volute portion extending from said bottom portion to the top of said head and in contact with said internal face, the surface of the volute part of the mold board, opposite the internal face of the head, being roughened part way up the mold board, said volute part of the mold board crossing the spiral thread on the head at an acute angle.

5. In a machine of the class described, the combination of a rotary head having a flaring, internal, dough-rolling face, a spirally formed mold board in said head, contacting along its lower edge with said internal face of the head, a stationary shaft concentric with the axis of said head, and arms fixedly secured to said mold board, and having hubs encircling said shaft and adjustably secured thereon, whereby the entire mold board may be lowered or raised as a whole.

6. In a machine of the class described, a stationarily supported, spirally formed mold board inclined upwardly from the internal face of a hollow cone shaped dough molding head for the purpose specified, and having a scraper removably secured on its lower edge, contacting with said internal face.

7. In a machine of the class described, a stationarily supported, spirally formed, sectional mold board, for the purpose specified, each section having offset end portions overlapping the adjacent sections and bolted thereto, said mold board having a scraper secured on its lower edge.

8. In a machine of the class described, a stationarily supported, spirally formed, sectional mold board, for the purpose specified, having a scraper removably secured to its lower edge.

9. In a machine of the class described, a stationarily supported, upright shaft, a spirally formed mold board for the purpose specified, and radially extending, horizontal arms rigidly secured to said mold board, and having hubs surrounding said shaft and adjustably secured thereon, whereby said mold board may be raised or lowered on said shaft as a whole.

10. In a machine of the class described, the combination of a rotary head having an upwardly flaring, internal dough rolling face, a stationary, spirally formed mold board in said head contacting with said internal face and forming therewith a spiral groove for receiving and rolling the dough, a feed chute located above the bottom of said groove and a support for said chute adjustably mounted to swing in a horizontal plane, whereby said feed chute may be turned to various positions of adjustment over said groove.

11. In a machine of the class described, the combination of a head having an upwardly flaring, internal dough rolling face, rotating mechanism therefor, a centrally located, upright, stationarily supported shaft, and a spirally formed mold board located in the hollow of said head and having radially extending arms formed with hubs encircling said shaft, said hubs being provided with set screws bearing against said shaft, said mold board contacting along its lower edge with said internal face of the head.

12. In a machine of the class described, the combination of a base, a head having a downwardly projecting hub resting on said base, said head having an upwardly flaring, internal, dough-rolling face formed with a continuous spiral thread therein, extending from top to bottom of said head in approximately horizontal planes, head rotating means, a vertical shaft secured in said base and extending up through said hub and head, a spirally formed mold board within the hollow of said head and secured to said shaft, said mold board contacting along its lower edge with said internal face, a portion of the face of said mold board opposite said internal face of the head being roughened, and said mold board crossing said spiral thread at an acute angle.

13. In a machine of the class described, the combination of a dough-rolling head having a continuous spiral thread on its working face, extending from top to bottom of said head in approximately horizontal planes, and a spirally shaped mold board contacting with said working face and forming therewith a spiral trough in which the dough is rolled, said head and mold board being relatively movable, and the spiral thread of the head running at an acute angle to the spiral mold board, and acting to draw the dough down into the bottom of the trough.

FRANK STREICH.

Witnesses:
 A. G. DURANT,
 C. S. HOOVER.